(12) United States Patent
Huang

(10) Patent No.: US 7,231,935 B2
(45) Date of Patent: Jun. 19, 2007

(54) FAUCET

(76) Inventor: Wen-Shun Huang, No. 96, Lane 465, Sec. 1, Daren Rd., Wuci Township, Taichung County 43544 (TW)

( * ) Notice: Subject to any disclaimer, the term of this patent is extended or adjusted under 35 U.S.C. 154(b) by 44 days.

(21) Appl. No.: 11/205,055

(22) Filed: Aug. 17, 2005

(65) Prior Publication Data

US 2007/0040142 A1  Feb. 22, 2007

(51) Int. Cl.
*F16K 31/60* (2006.01)
*F16K 43/00* (2006.01)
*F16K 51/00* (2006.01)
*F16L 55/18* (2006.01)

(52) U.S. Cl. .................. 137/315.15; 137/359; 74/548; 251/286; 251/288

(58) Field of Classification Search ........... 137/315.15, 137/359; 74/548, 553; 16/412, 413, 438; 251/286, 287, 288
See application file for complete search history.

(56) References Cited

U.S. PATENT DOCUMENTS

| | | | |
|---|---|---|---|
| 4,739,788 A | * 4/1988 | Reback | 137/15.18 |
| 4,842,009 A | * 6/1989 | Reback | 137/315.15 |
| 5,025,826 A | * 6/1991 | Schoepe et al. | 137/315.15 |
| 6,058,972 A | * 5/2000 | Kahle et al. | 137/625.4 |
| 6,807,983 B1 | * 10/2004 | Erickson | 137/359 |

* cited by examiner

*Primary Examiner*—Eric Keasel
*Assistant Examiner*—John K. Fristoe, Jr.
(74) *Attorney, Agent, or Firm*—Rosenberg, Klein & Lee

(57) ABSTRACT

This invention relates to a faucet, which comprises a body and a rotation control device. The body is assembled with a control valve and the control valve has a valve rod. The rotation control device comprises a shell, a handle and a fixing base. The shell is mainly forged with copper material and covers the body. The handle has a connecting part connected to the valve rod through the shell. Furthermore, the fixing base is made of plastic material and comprises a base disc and two fixing plates. The base disc is fixed within the shell and has a through-hole for the valve rod to pass through. The two fixing plates are formed on two opposite sides of the through-hole and tightly clipped with the connecting part of the handle.

7 Claims, 5 Drawing Sheets

FAUCET

TECHNICAL FIELD

This invention relates generally to a faucet, and particularly to a faucet which comprises an improved structure of a rotation control device so as to control the water supply of the faucet.

BACKGROUND OF THE INVENTION

FIG. 4 and FIG. 5 show a conventional faucet structure and disclose a body 5 of the faucet assembled with a control valve 5a. The control valve 5a has a valve rod 50 extending from the body 5 for connecting with a rotation control device 9. The rotation control device 9 includes a shell 6 and a handle 7. The shell 6 has a slot 61 and the handle 7 has a connecting part 71. The shell 6 covers the body 5 and the connecting part 71 of the handle 7 is connected to the valve rod 50 by passing through the shell 6 via the slot 61 and fixed on the valve rod 50 by a screw 8. Thus, when the handle 7 is rotated to any directions, a ceramic mobile valve plate located inside of the control valve 5a will be moved simultaneously through the valve rod 50, and the positional variation of the ceramic mobile valve plate determines a mixing ratio of cool and hot water to flow out of the body 5.

For purposes of easy installations, an inner diameter of the connecting part 71 of the hand 7 is usually larger than an outer diameter of the valve rod 50, and the handle 7 is fixed only with the screw 8. However, this installation will cause the handle 7 to loosen from the valve rod 50 due to the screw 8 is loosened after a long period of operation. Once the handle 7 is loosened, the faucet becomes hard to control and the handle 7 is easy to collide with an inner wall of the slot 61 during rotation that cause damages to the shell 6 and the handle 7 both.

Moreover, in consideration of reducing material costs and manufacturing difficulties, the shell 6 is cast in weaker zinc alloy. Thus, as shown in FIG. 4, the inside of the shell 6 have to form with two reinforced plates 62. However, regardless of this effort, the shell 6 still cannot endure a larger impact because of the weaker structure of the shell 6.

Furthermore, in order to prevent erosion and to improve the product quality, the outer surface of the shell 6 is plated with a layer of chromium but the adhesion between chromium and zinc alloy is not compatible, the chromium plated on the surface of the shell 6 is easy to fall off due to collision, or peel off due to oxidation.

SUMMARY OF INVENTION

The primary objective of the present invention is to provide a faucet, which comprises a body and a rotation control device. The body is assembled with a control valve, which has a valve rod. The rotation control device comprises a shell, a handle, and a fixing base. The shell is mainly forged with copper material and covers the body. The handle has a connecting part connected to the valve rod through the shell. Furthermore, the fixing base is made of plastic material and comprises a base disc and two fixing plates. The base disc is fixed within the shell and has a through-hole for the valve rod to pass through. The two fixing plates are formed on two opposite sides of the through-hole and tightly clipped with the connecting part of the handle.

Comparing to the prior art, because the connecting part of the handle is clipped by the two fixing plates of the fixing base, the handle will not be loosened even when the connecting part of the handle is not fixed with a screw. Moreover, the shell is forged with copper-based material so the shell has the benefit of rigidity and endurance without additional reinforced plates formed therein. Furthermore, the chromium plated on the outer surface of the shell will not be torn off or peeled off by oxidation due to its better adhesion with the copper.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
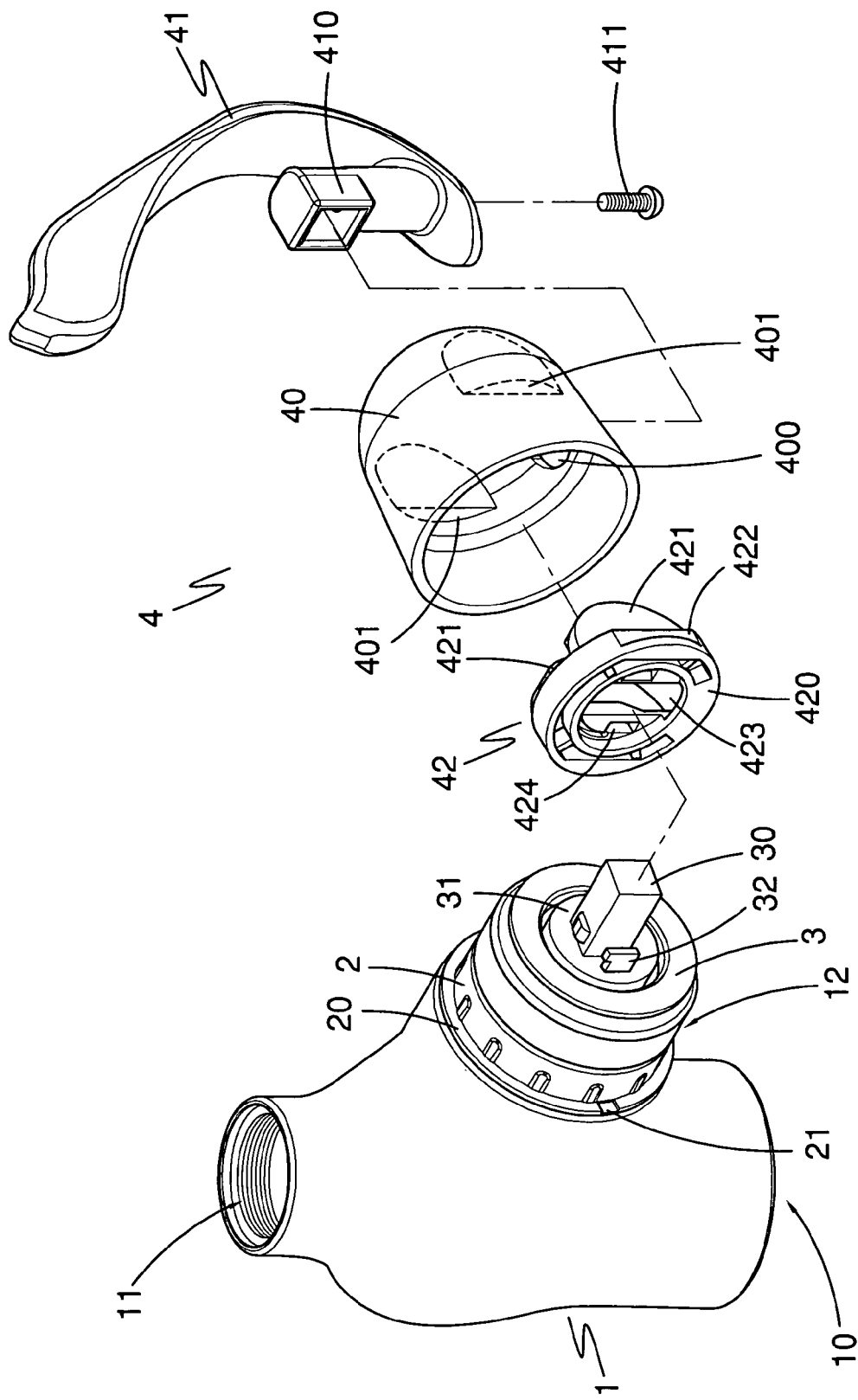
FIG. 1 is a perspective exploded view of the present invention.
Figure 2:
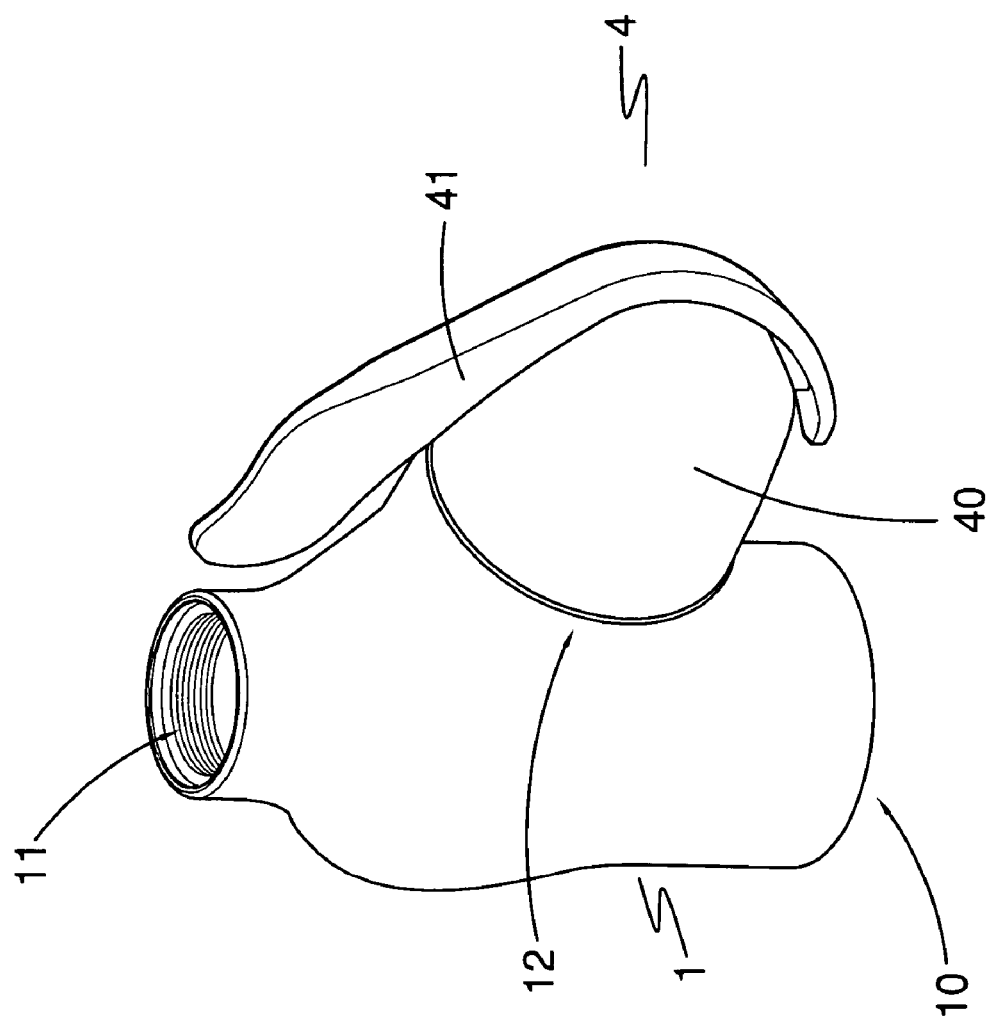
FIG. 2 is a perspective assembly view of the present invention.

FIG. 1 and FIG. 2 show a faucet as a preferred embodiment of the present invention and the faucet comprise a body 1, a rotational busing bushing 2, a control valve 3 and a rotation control device 4.

The body 1 has an inlet 10, an outlet 11, and an assembly opening 12. In addition, the inlet 10 is provided for receiving water and the outlet 11 is provided for supplying water, and the assembly opening 12 is arranged and positioned between the inlet 10 and the outlet 11. The rotational bushing 2 is rotatably connected to an outer perimeter of the assembly opening 12. A bottom of the outer perimeter of the rotational bushing 2 forms is formed with a flange 20 and a top of the flange 20 is formed with a groove 21.

Furthermore, the control valve 3 is fixed inside the assembly opening 12 of the body 1, and has a valve rod 30 and a shaft seat 31. The valve rod 30 is provided to control the outflow of the water and the shaft seat 31 is provided to install with the valve rod 30 and to rotate simultaneously with the valve rod 30. The shaft seat 31 has two insert posts 32 formed on the shaft seat 31.

The rotation control device 4 comprises a shell 40, a handle 41, and a fixing base 42. The shell 40 covers on the rotational bushing 2 connected with the perimeter of the assembly opening 12. The shell 40 is mainly forged with copper material and plated with a layer of chromium thereon. In addition, a side of the shell 40 has a slot 400 penetrating therethrough and two opposite sides of an inner wall of the shell 40 are formed with a fixing wedge 401 respectively.

In addition, the handle 41 has a connecting part 410, which is connected with the valve rod 30 of the control valve 3 by passing through the shell 40 via the slot 400, and the handle 41 is fixed to the valve rod 30 by a screw 411. The fixing base 42 is made of plastic material and comprises a base disc 420 and two fixing plates 421. Furthermore, two notches 422 formed on two opposite sides of the base disc 420 respectively and the two notches 422 are provided for engaging and positioning with the fixing wedges 401 of the shell 40. The base disc 420 has a through-hole 423 for the valve rod 30 to pass through and a bottom of the base disc 420 is further formed with two apertures 424 for receiving the two insert posts 32 of the shaft seat 31 respectively. The two fixing plates 421 are formed on two opposite sides of the through-hole 423 respectively and tightly clipped with the connecting part 410 of the handle 41.

Figure 3:
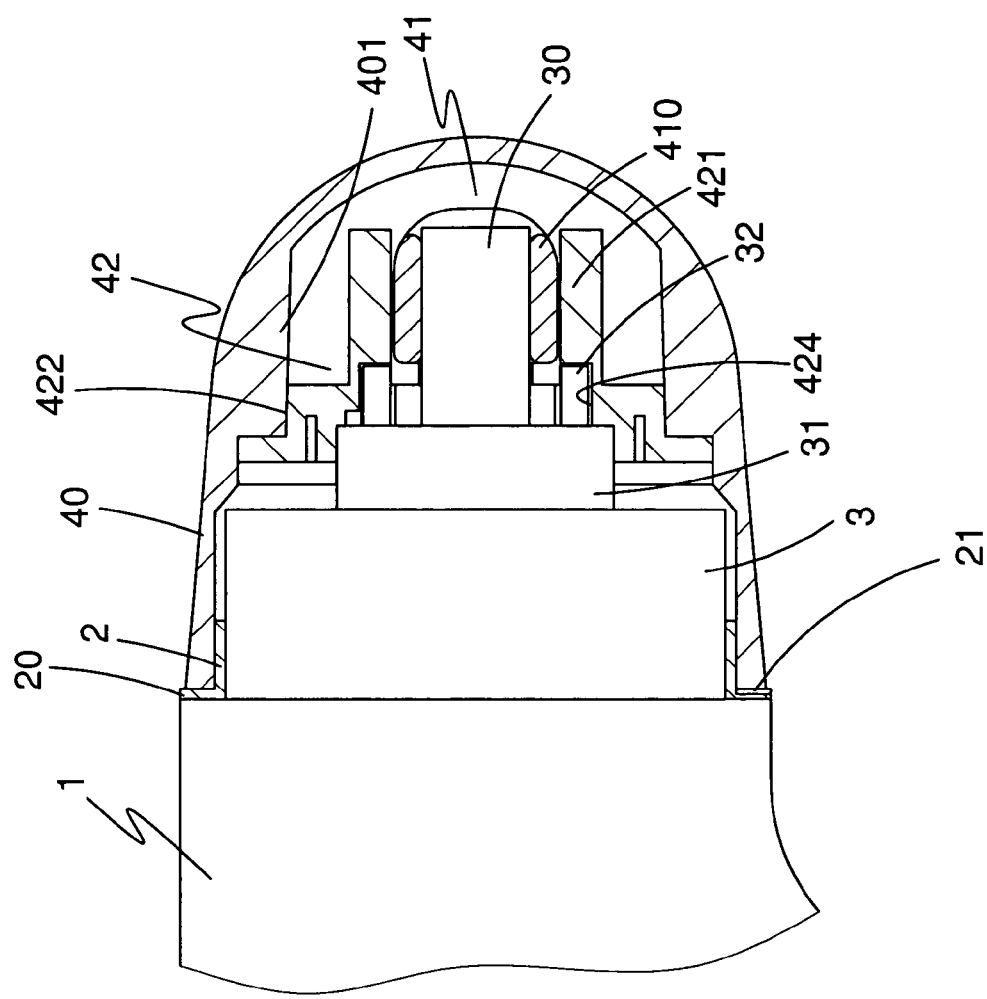
FIG. 3 is a partial cross-sectional view of the present invention.
Figure 4:
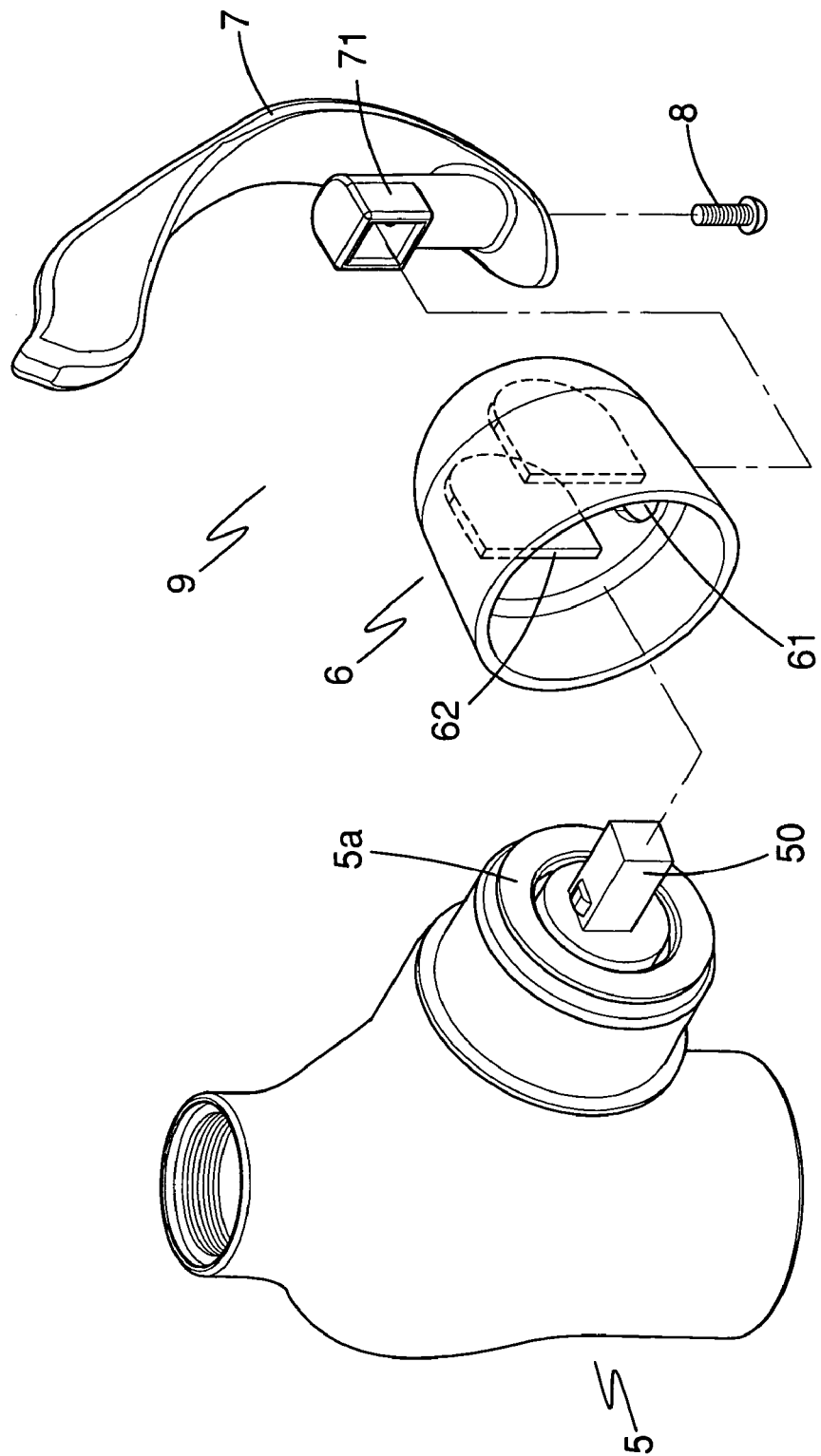
FIG. 4 is a perspective exploded view of a conventional faucet.
Figure 5:
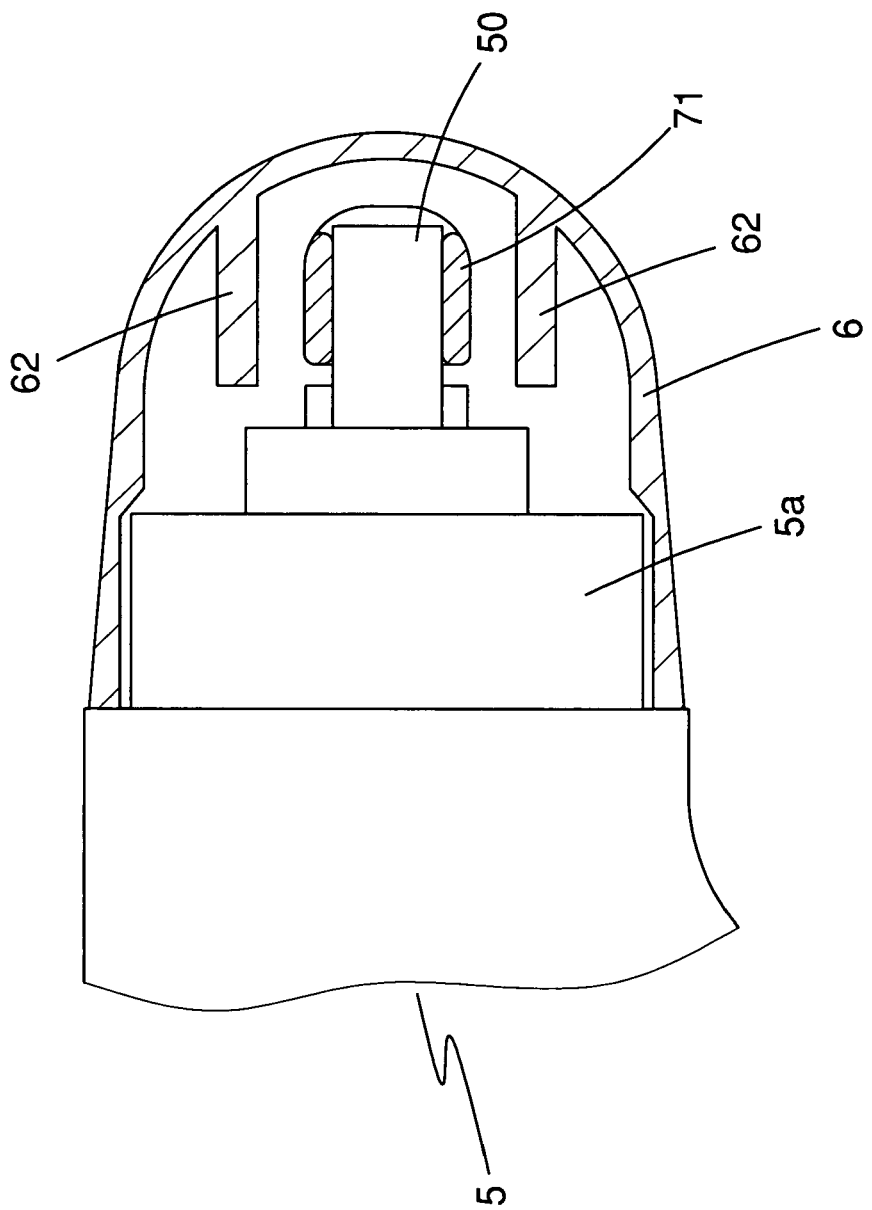
FIG. 5 is partial cross-sectional view of the conventional faucet.

FIG. 3 shows that the flange 20 of the rotational bushing 2 is clipped between a bottom edge of the shell 40 and the body 1 so that the groove 21 on the flange 20 can be reached by a tool so as to easily prize the shell 40 off the body 1. Furthermore, the two insert posts 32 on the shaft seat 31 are inserted into the two apertures 424 of the bottom of the base disc 420, and the two fixing plates 421 tightly clip two sides of the connecting part 410 of the handle 41. Therefore, when the connecting part 410 of the handle 41 drives the valve rod 30, the fixing base 42 is also driven accordingly. Because the two apertures 424 and the two insert posts 32 are connected, the shaft seat 31 is capable of rotating with the valve rod 30 simultaneously according to the above movements, so as to save strength from driving of the handle 41 and to have the driving of the handle 41 more smooth.

Because the connecting part 410 of the handle 41 is tightly clipped by the two fixing plates 421 of the fixing base 42, the handle 41 will not be loosened even when the screw 411 fixed on the connecting part 410 of the rod 41 becomes loosen or when the handle 41 is not fixed by the screw 411. Also, the shell 40 is mainly forged with copper material so the shell 40 has the advantage of rigidity and endurance, and the inner wall of the shell 40 can be formed without additional reinforced plates. In addition, the chromium plated on the outer surface of the shell 40 will not be torn off or peeled off by oxidation due to its better adhesion with the copper.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:

1. A faucet comprising:
   a body comprising an inlet, an outlet, and an assembly opening, wherein the inlet is provided for receiving water, and the outlet is provided for supplying water, and the assembly opening is positioned between the inlet and the outlet;
   a control valve fixed within the assembly opening of the body, and comprising a valve rod for controlling the outflow of water, and a shaft seat rotating simultaneously with the valve rod, wherein the shaft seat comprises two insert posts; and
   a rotation control device comprising:
   a shell covered on the assembly opening of the body, and mainly forged with copper material, wherein the shell has a slot penetrating therethrough;
   a handle having a connecting part connected to the valve rod of the control valve by passing through the shell via the slot; and
   a fixing base made of plastic material and comprising a base disc and two fixing plates, the base disc having a through-hole for the valve rod to pass through and two apertures for engaging with the insert posts respectively, and the two fixing plates being formed on two opposite sides of the through-hole respectively and tightly clipped with the connecting part of the handle.

2. The faucet of claim 1, further comprising a rotational bushing rotatably connected to an outer perimeter of the assembly opening and a bottom of an outer perimeter of the rotational bushing formed with a flange, and a top of the flange formed with a groove, wherein the shell covers the rotational bushing to make the flange clipped between a bottom edge of the shell and the body.

3. The faucet of claim 2, wherein the inner wall of the shell forms with a plurality of fixing wedges, and the base disc of the fixing base has a plurality of notches for engaging and positioning the plurality of the fixing wedges respectively.

4. A faucet comprising:
   a body comprising an inlet, an outlet, and an assembly opening, wherein the inlet is provided for receiving water, and the outlet is provided for supplying water, and the assembly opening is positioned between the inlet and the outlet;
   a rotational bushing rotatably connected to an outer perimeter of the assembly opening and a bottom of an outer perimeter of the rotational bushing formed with a flange, and a top of the flange formed with a groove,
   a control valve fixed within the assembly opening of the body, and comprising a valve rod for controlling the outflow of water; and,
   a rotation control device comprising:
   a shell for covering the assembly opening of the body, wherein the shell is forged with copper material and defines a slot, and the shell covers the rotational bushing to make the tinge clipped between a bottom edge and the shell and the body;
   a handle comprising a connecting part connected to the valve rod of the control valve by passing through the shell via the slot; and
   a plastic fixing base comprising a base disc defining a through-hole for receiving the valve rod, and two fixing plates formed on two opposite sides of the through-hole for clipping the connecting part of the handle.

5. A faucet comprising:
   a body having an inlet for receiving water, an outlet for supplying water, and an assembly opening positioned between the inlet and the outlet;
   a control valve fixed within the assembly opening of the body, and comprising a valve rod for controlling the outflow of water; and
   a rotation control device comprising:
   a shell for covering the assembly opening of the body, wherein the shell is forged with copper material and defines a slot, and the shell comprises a plurality of fixing wedges on an internal wall;
   a handle comprising a connecting part connected to the valve rod of the control valve by passing through the shell via the slot; and
   a plastic fixing base comprising a base disc defining, a plurality of notches for engaging and positioning the plurality of the fixing wedges respectively and a through-hole for receiving the valve rod, and two fixing plates formed on two opposite sides of the through-hole for clipping the connecting part of the handle.

6. The faucet of claim 5, further comprising a rotational bushing rotatably connected to an outer perimeter of the assembly opening and a bottom of an outer perimeter of the rotational bushing formed with a flange, and a top of the flange formed with a groove, wherein the shell covers the rotational bushing to make the flange clipped between a bottom edge of the shell and the body.

7. The faucet of claim 6, wherein the internal wall of the shell forms with a plurality of fixing wedges, and the base disc of the fixing base has a plurality of notches for engaging and positioning the plurality of the fixing wedges respectively.

* * * * *